United States Patent [19]
Harsch

[11] 3,837,729
[45] Sept. 24, 1974

[54] LIQUID CRYSTAL DISPLAY

[75] Inventor: Thomas B. Harsch, Stow, Ohio

[73] Assignee: Hoffman-La Roche Inc., Nutley, N.J.

[22] Filed: May 14, 1973

[21] Appl. No.: 360,306

[52] U.S. Cl............................ 350/160 LC, 350/150
[51] Int. Cl................................................ G02f 1/16
[58] Field of Search............................ 350/160 LC

[56] References Cited
UNITED STATES PATENTS
3,784,280  1/1974  Bigelow.......................... 350/150

*Primary Examiner*—Edward S. Bauer
*Assistant Examiner*—Matthew W. Koren
*Attorney, Agent, or Firm*—Brown, Murray, Flick & Peckham

[57] ABSTRACT

High efficiency reflection without ghosts or distracting background images is obtained in a liquid crystal display of the type having a twisted nematic structure. The display employs only a single polarizer on the front face of the display; while the rear surface is provided with a reflector assembly which will scatter and reflect polarized light without depolarizing the same. The reflector can comprise a transparent plate having a diffused surface facing the liquid crystal layer and a metalized reflecting backing on its opposite side. Alternately, the reflector assembly can comprise a metalized reflecting surface which is roughened to produce the required scattering effect.

6 Claims, 5 Drawing Figures

LIQUID CRYSTAL DISPLAY

BACKGROUND OF THE INVENTION

In a polarized light shutter liquid crystal display employing a twisted nematic structure, the liquid crystal cell is such that it rotates the plane of polarization of polarized light through 90°. Assuming that the liquid crystal cell is placed between cross-polarizers as shown in U.S. Pat. No. 3,731,986, issued May 8, 1973, the unactivated cell can be made to transmit light. If a reflector is placed behind the liquid crystal cell and polarizer combination described in that application, and sufficient polarization is retained after reflection from the reflector, the display can be made to appear bright when unactivated. However, when a liquid crystal cell of this type is activated by applying a potential thereacross, the ability of the liquid crystal to rotate the plane of polarization is destroyed and the cell appears dark or opaque since the incident light is blocked from the reflector. On the other hand, the cell can be constructed so as to normally block light until activated. The result is essentially the same except that images appear white on a black background rather than vice versa as is the case when the cell transmits light when unactivated.

When a simple metalized reflector is placed behind a polarized display of the type shown in U.S. Pat. No. 3,731,986, the display has an extremely small viewing angle. In addition, there are annoying background reflections and a metallic sheen to the display which is physiologically unacceptable.

In copending application Ser. No. 364,027, filed May 25, 1973 (continuation-in-part of Ser. No. 233,678, filed Apr. 10, 1972, and now abandoned), a reflector arrangement is provided for liquid crystal displays of the polarized light type which promotes a wide viewing angle, good reflection of polarized light, a high contrast ratio, and the absence of unwanted reflections. Specifically, the reflector provided in application Ser. No. 364,027 is a metalized reflector which will reflect and scatter incident polarized light without depolarizing the same. In one embodiment of the invention shown in that application, the reflector assembly comprises a transparent plate having a diffuse surface on one side adjacent the liquid crystal display and a reflective surface on its other side. The polarized light passing through one polarizer at the rear of the display passes through the diffuse surface, whereupon it is scattered. As it continues through the transparent plate, it strikes the metalized reflective surface and is then reflected back through the liquid crystal display. It is also possible, in accordance with the teachings of copending application Ser. No. 364,027, to utilize a metallic reflector with a roughened surface, each as a metallic reflector formed from particles or granules of metalized reflecting material. However, in the devices described in copending application Ser. No. 364,027, it was felt necessary to have polarizers on both the front and back of the liquid crystal display, these polarizers being crossed or parallel depending upon whether dark numerals on a light background are desired, or vice versa.

SUMMARY OF THE INVENTION

In accordance with the present invention, a new and improved liquid crystal display of the polarized light type is described comprising a layer of nematic liquid crystal material of positive dielectric anisotropy disposed between transparent parallel plates. Both of the plates are coated with films of transparent conducting material on the sides thereof facing the liquid crystal layer. At least one of the plates is coated on only selected areas thereof with films of transparent conducting material so as to form numerals or the like in an alpha-numeric display. The two transparent plates facing the liquid crystal layer are rubbed at right angles to each other so as to effect a twisted nematic structure. Adjacent and in front of the transparent plate which is coated on only selected areas thereof with transparent conducting material is a single polarizer, this polarizer being the only one utilized in the display. A reflector assembly is disposed on the other side of the layer of liquid crystal material without an intervening polarizer, the reflector assembly being such as to scatter polarized light and reflect it back through the display without depolarizing the same.

In the absence of an electrical potential applied between the transparent conducting electrodes on the opposite sides of the liquid crystal film, polarized light from the polarizer in front of the display will pass through the liquid crystal layer while being rotated through 90° due to its twisted nematic structure. When this polarized light strikes the reflector assembly, it is scattered and reflected; whereupon it is again rotated through 90° and passes out through the front polarizer in both those areas covered by the conducting films and those not covered. However, when an electrical potential of sufficient magnitude is applied between the transparent electrodes, the twisted nematic structure will be destroyed in those areas covered by the electrodes, meaning that the scattered polarized light will not be rotated through 90° in its return travel from the reflector and will not pass through the front polarizer. In this manner, the indicia formed by the conducting films on the front plate of the display will form an optical image. The films of transparent material, in accordance with usual practice, can be formed in segments which are selectively energized to form any numeral, for example, from 0 through 9.

The above and other objects and features of the invention will become apparent from the following detailed description taken in connection with the accompanying drawings which form a part of this specification, and in which.

Figure 1:
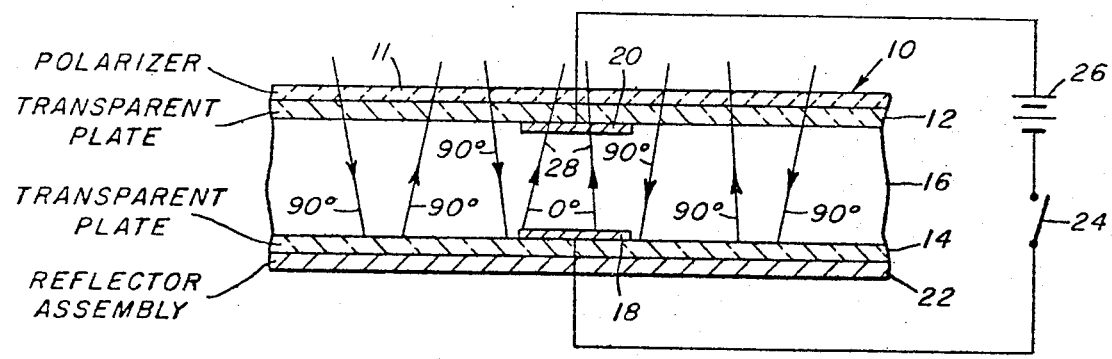
FIG. 1 is a schematic cross-sectional view of the liquid crystal unit made in accordance with the present invention.

With reference now to the drawings, and particularly to FIG. 1, there is shown a liquid crystal unit 10 comprising a first or front transparent plate 12, preferably of glass, and a second or back transparent plate 14, also of glass and extending parallel to the plate 12. The plates 12 and 14 are spaced apart by suitable spacers, not show, by approximately 0.1 to 2 mils. This space is filled with a layer 16 of a nematic-phase liquid crystal material of positive dielectric anisotropy, preferably comprising 20 to 80 percent each of bis-(4'-n-octyloxybenzal)-2-chlorophenylenediamine and p-methylbenzal-p'-n-butylaniline, these making up about 60 percent to 97 percent of the total composition and p-cyanobenzal-p'-n-butylaniline comprising the remaining 3 to 40 percent. This material is more fully described in copending application Ser. No. 113,948 filed Feb. 9, 1971.

Disposed on the inner surfaces of the transparent plates 12 and 14 and in contact with the liquid crystal layer 16 are coatings 18 and 20 of thin transparent electroconductive material such as tin oxide or indium oxide. These coatings are quite thin and highly resistive, for example, on the order of 150 ohms per unit square or above, and possibly as high as 5,000–10,000 ohms per unit square.

Behind the back transparent plate 14 is a reflector assembly 22 which, as will hereinafter be described in detail, has the capability of scattering and reflecting polarized light without depolarizing the same.

In the preparation of the liquid crystal unit of FIG. 1, the surfaces of the transparent plates 12 and 14 in contact with the liquid crystal film 16 are rubbed unidirectionally at right angles to each other. The effect of this is to produce a twisted nematic structure. That is, the molecules in a nematic-phase liquid crystal material are each long and straight, and they tend to lie parallel, like logs in a river or straws in a broom. Their parallelism is statistical, rather than perfect and exact. They are free to move with respect to one another; and there are some that are at a small acute angle with respect to the others. A property of the nematic-phase liquid crystal material is that the molecules in the vicinity of a rubbed surface tend to align themselves with it. Thus, the molecules nearest the surface of the plate 12, for example, are inclined to orient themselves parallel with the rubbed lines on that plate; and those nearest the surface of plate 14 are inclined to orient themselves parallel to the lines on that plate which are at right angles to the lines on the front plate 12. As a result, a twisted nematic structure is created which will rotate the plane of polarized light passing through the front polarizer 11 by 90°, assuming that no electrical field is applied between the plates 12 and 14. If, however, an electrical field is so applied, the twisted structure is destroyed and the plane of polarization is no longer rotated through 90°. Thus, polarized light passing through the polarizer 11 will be rotated through 90° in the absence of an electrical field applied across the liquid crystal layer 16, will pass through the plate 14 and be reflected by reflector 22 back through the liquid crystal layer and out through the polarizer 11. In this process, the polarized light is rotated 90° in passing from the front plate to the back plate and is again rotated through 90° after reflection in passing from the back plate to the front plate. Hence, the result is to align the reflected polarized light with the front polarizer 11 whereby it will pass therethrough.

On the other hand, if an electrical potential is applied across the transparent electrodes 18 and 20 by, for example, closing switch 24 to connect battery 26 across the electrodes, then the twisted structure of the nematic liquid crystal of positive dielectric anisotropy will be destroyed such that light will not be rotated through 90° in either direction. Thus, if light were to pass directly through the front transparent electrode to the back electrode and thereafter be reflected again to the front electrode, no rotation of the polarized light will occur and the entire area of the display, including the transparent electrodes 18 and 20, will appear as a white or light background.

If, however, certain of the light which passes through the front plate 12 adjacent the electrodes 18 and 20 is scattered so that it attempts to pass out of the display in the area of the electrodes 18 and 20, the situation is different. It will be rotated through 90° in passing from the front plate to the back plate. However, when it is scattered and attempts to pass out of the front plate 12 in the area of the electrodes 18 and 20, it will not be rotated through 90° in its return path of travel. This is indicated, for example, by the light rays 28 in FIG. 1. These resulted from light rays passing through the front plate 12 adjacent the electrodes 18 and 20. After scattering, these rays attempt to pass through the front plate 12 and the polarizer 11. However, since the polarization vector is now at 90° with respect to the direction of polarization of the front polarizer 11, the rays will not pass through the polarizer and the display will appear dark or opaque in the area of the electrodes 18 and 20.

Figure 2:
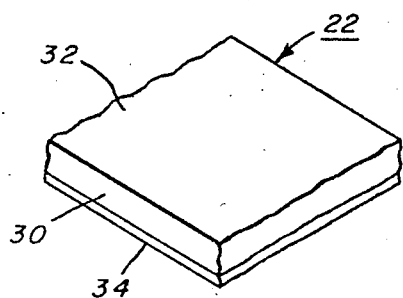
FIG. 2 is a perspective view of one type of reflector assembly which can be used in the unit of FIG. 1.

In order to effect an arrangement wherein light passes through the front plate 12 adjacent the electrodes 18 and 20 and then attempts to pass out of the display in the area of the electrodes, it is necessary to scatter and reflect the light at the rear of the display via the reflector assembly 22. The reflector assembly 22, as shown in FIG. 2, may comprise a layer 30 of transparent material having a diffuse or roughened front surface 32 and a rear surface coated with a reflecting film 34, such as aluminum or silver. The metalized film or surface 34 provides excellent reflective characteristics; while the diffuse front surface 32 of the reflector assembly scatters the light, increasing in scattering angle, both as it passes into the transparent plate 30 and as it is reflected and again passes through the scattering or diffuse surface. As a result, the light being scattered twice causes a substantial increase in the viewing angle but it does not cause any loss in polarization. That is, as the polarized light passes through the front diffuse surface 32, it is forward-scattered without being depolarized; is thereafter reflected from the film or surface 34, and again passes through the front surface 32 where the scattering angle is increased. This, of course, facilitates an arrangement wherein light rays can pass through areas of the front transparent plate 12 adjacent the electrodes 18 and 20 and thereafter be reflected back in the area of the electrodes such that the electrodes will appear dark or opaque.

Figure 3:
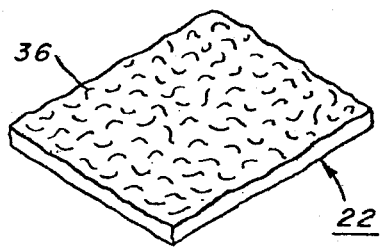
FIG. 3 is a perspective view of another type of reflector assembly that can be used in the unit of FIG. 1.

Instead of using a transparent plate with a metallic reflecting layer on its rear surface, it is also possible to use an arrangement such as that shown in FIG. 3 wherein the reflector assembly 22 comprises a sheet or film of metallic reflecting material having a roughened front surface 36. The roughened front surface 36 may be produced, for example, by sandblasting. Alternatively, the entire reflector assembly can be formed from powdered or granular reflecting particles to effect the desired scattering effect without depolarizing the polarized light.

Figure 4:
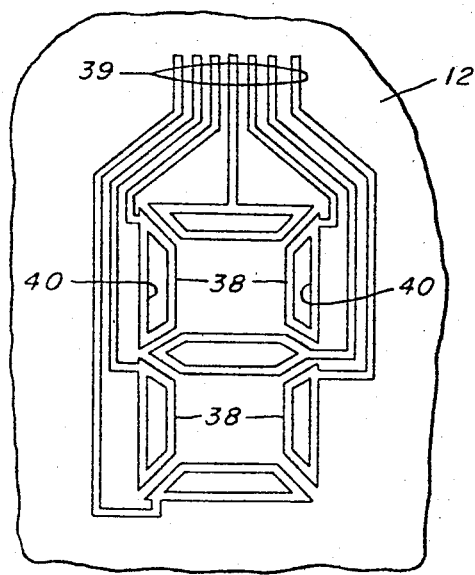
FIG. 4 illustrates the manner in which conductive films on the front transparent plate of the unit of FIG. 1 can be etched to provide different optical images while maximizing the light passing through to the rear reflector of the assembly of FIG. 1.

It will be appreciated that since light which passes through the electrodes 20 and is then reflected back through the same electrode can also pass through the front polarizer 11, the area of the front electrode 20 should be reduced if possible. In FIG. 4, a suitable arrangement for minimizing the amount of light which passes through both electrodes is shown. The front plate 12 is provided with transparent conducting strips 38 which, assuming that all are opaque, will represent the numeral 8. However, by causing selected ones of the strips to become opaque, any numeral from 0 through 9 can be made to appear. The various mutually-insulated conductive strips 38 are adapted to be connected through a plurality of mutually-insulated strips of transparent conducting material 39 to external leads, not shown. At the same time, the back transparent plate 14 will be provided with a transparent conducting layer which covers the entire configuration of strips 38 shown in FIG. 4. The transparent conducting electrode on the back plate 14 is connected to one terminal of a source of potential while selected ones of the strips 38 on the front plate are connected to the other terminal of the potential source such that the twisted nematic structure is destroyed in only certain areas, resulting in any desired numeral, depending upon which strips are energized. It will be noted in FIG. 4, however, that each of the strips 38 is provided with a central aperture 40 which permits more light to pass through the front of the display, thereby increasing the magnitude of the light rays which can strike the back reflector assembly 22 and be blocked from transmission through the front polarizer 11 due to the fact that they are rotated through 90° in passing to the back reflector assembly 22 without being rotated in passing from the reflector back through the electrode.

Figure 5:
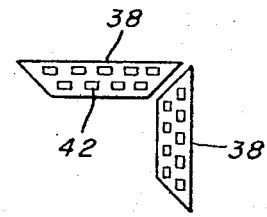
FIG. 5 is an illustration of still another manner in which the conductive films can be etched to provide different optical images.

A similar arrangement is shown in FIG. 5 wherein the transparent strips 38 forming an alpha-numeric display are provided with a plurality of spaced apertures 42 with the same overall effect. This is, the apertures 42 permit more polarized light to pass through the back reflector assembly while being rotated through 90°, The resulting reflected and scattered light striking the transparent electrode without rotation such that it does not pass through the front polarizer 11 and the areas of the strips 38 appear opaque to form the desired alpha-numeric display.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A liquid crystal electro-optical display comprising a layer of liquid crystal material of positive dielectric anisotropy disposed between front and rear transparent parallel plates, both of said plates being coated with films of transparent conducting material on the sides thereof facing said liquid crystal layer, the films of transparent conducting material on said front plate being on only selected areas thereof, means for effecting a twisted nematic structure in said layer of liquid crystal material, a polarizer on the side of said layer of liquid crystal material adjacent said front plate, said polarizer being the only one in said display, and a reflector assembly disposed on the other side of said layer of liquid crystal material adjacent said rear plate, the reflector assembly being such as to cause at least a portion of the light passing through areas of the front plate not coated with the conducting material to be returned from the reflector assembly so as to intersect an area of the front plate which is coated with conducting material.

2. The liquid crystal display of claim 1 wherein said reflector assembly comprises a transparent plate having a diffusing surface on its side adjacent the rear transparent parallel plate and a reflective surface on its other side.

3. The liquid crystal display of claim 1 wherein said reflector assembly comprises a metalized reflector having a roughened surface adjacent said rear transparent plate.

4. The liquid crystal display of claim 3 wherein said reflector assembly is formed from metalized granules.

5. The liquid crystal display of claim 1 wherein the films of transparent conducting material on said front plate comprise conducting strips adapted to form an alphanumerical display, the conducting strips having cut-away portions.

6. The liquid crystal display of claim 1 wherein said reflector assembly is such as to scatter polarized light without depolarizing the same.

* * * * *